United States Patent [19]

Cooke, Jr. et al.

[11] 3,998,271

[45] Dec. 21, 1976

[54] MULTIPLE FRACTURING OF SUBTERRANEAN FORMATIONS

[75] Inventors: Claude E. Cooke, Jr.; John W. Graham; Thomas W. Muecke, all of Houston, Tex.

[73] Assignee: Exxon Production Research Company, Houston, Tex.

[22] Filed: Oct. 31, 1975

[21] Appl. No.: 627,738

[52] U.S. Cl. .............................. 166/280; 166/308; 166/281

[51] Int. Cl.² ....................................... E21B 43/26

[58] Field of Search .......... 166/276, 280, 295, 308, 166/281

[56] References Cited

UNITED STATES PATENTS

| | | | |
|---|---|---|---|
| 2,838,116 | 6/1958 | Clark, Jr. et al. | 166/281 X |
| 2,986,538 | 5/1961 | Nesbitt et al. | 166/276 X |
| 3,070,160 | 12/1962 | Reistle, Jr. | 166/281 |
| 3,138,205 | 6/1964 | Kerver et al. | 166/280 |
| 3,431,977 | 3/1969 | East et al. | 166/281 |
| 3,537,529 | 11/1970 | Timmerman | 166/281 X |
| 3,757,862 | 9/1973 | Kern et al. | 166/281 X |
| 3,929,191 | 12/1975 | Graham et al. | 166/280 |

*Primary Examiner*—Stephen J. Novosad
*Attorney, Agent, or Firm*—Robert L. Graham; Salvatore J. Casamassima

[57] ABSTRACT

A method of fracturing subterranean formations wherein a formation is fractured and propped two or more times to increase the width of the propped fracture.

9 Claims, No Drawings

MULTIPLE FRACTURING OF SUBTERRANEAN FORMATIONS

BACKGROUND OF THE INVENTION

1. Field of the Invention

This invention relates to the hydraulic fracturing of subterranean formations surrounding oilwells, gas wells, water wells, and similar boreholes. In one aspect it relates to multiple fracturing of such formations.

2. Description of the Prior Art

Hydraulic fracturing is a well stimulation technique which involves injecting a fracturing fluid into the formation at rates and pressures sufficient to rupture the formation. In most formations, the earth stresses are such that a vertical crack (fracture) is formed by the hydraulic fracturing treatment. Once the fracture is initiated, continued injection of the fracturing fluid causes the fracture to grow in length and width. A particulate material suspended in a carrier fluid is then placed in the fracture to maintain it in a propped condition when the fracture-inducing pressure is relieved.

In the fracturing of most formations, it is desirable to maximize the width of the propped fracture. It is known that well stimulation is strongly influenced by the width of the propped fracture. When the product of width and fracture permeability is too small, fracture lengths will not improve well stimulation. However, as the fracture width increases, increased fracture lengths can improve well stimulation. The maximum fracture width is normally obtained by controlling variables, such as fluid viscosity and injection rate to achieve the desired fracture geometry. Although large dynamic widths are frequently obtained, the width of the closed fracture is substantially less than the dynamic width, mainly because of the relatively low concentration of proppant in the carrier fluid. In other words, most of the volume in the carrier fluid is liquid, which leaks off into the formation, leaving the proppant wedged between the formations walls.

Although the importance of fracture width has long been realized, widths larger than about 0.25 inches have probably not been achieved.

SUMMARY OF THE INVENTION

The purpose of the present invention is to provide a hydraulic fracturing method capable of producing large propped widths in fractures formed in subterranean formations.

The method involves the steps of propping the fracture with particulate material, consolidating the particulate material into a permeable mass, and thereafter refracturing the formation and then propping the fracture produced by the refracturing step. The process thus incrementally widens the fracture in a step-like manner—the net width of the propped fracture is increased by the successive fracturing and propping operations.

In a preferred embodiment, the propping agent employed in the present invention is a particulate material coated with a fusible thermosetting resin such as a one-step phenolic resin. The process employing this preferred material comprises the steps of fracturing a subterranean formation, placing the resin-coated particles in the formation, causing the resin to fuse and cure to an infusible state in situ of the formation, and thereafter refracturing the formation and placing a propping agent in the fracture. The use of the one-step phenolic offers the advantage that the propping agent, upon contact with other propping agents or formation sand, will become cemented together in a solid framework such that refracturing the formation will not result in the previously placed proppant settling or being displaced during the subsequent injection operations.

DESCRIPTION OF THE PREFERRED EMBODIMENTS

The preferred material employed in the method of the present invention is a one-step, base-catalyzed, phenolic resin. This type of resin is frequently referred to as a resole type phenolic resin, or an A-stage phenolic resin. The distinguishing characteristic of the one-step resin is that the resin is soluble in certain solvents, fusible and curable by the application of heat alone, and requires no additional or curing agent.

The one-step phenolic resins are prepared by reacting phenol with aldehydes in the presence of alkaline catalysts such as inorganic hydroxides, quaternary ammonium hydroxide or tertiary amines. In addition to phenol, resorcinol, alkyl substituted phenols such as cresol, and p-tert.-butyl-phenol, p-phenolphenol, and Cardanol may also be used. The aldehyde is normally formaldehyde but acetaldehyde and furfuraldehyde are also used. The one-step phenolic resins may be prepared by reacting phenol and formaldehyde in a mole ratio of between about 1:1 and about 1:1.5 at a pH above about 7. As the materials react, the average molecular weight of the resin increases. By cooling, the rate of reaction may be slowed and stopped to form a solid, partially polymerized resin which is soluble in organic solvents and is fusible. This solid, one-step, thermosetting resin is commercially available in powder form.

For use in well treatments, it is preferred that the fusible resin be applied as a coating to a particulate substrate. The particulate material may be coated by dissolving powdered resin in a suitable solvent, mixing the resulting solution with the particles, and finally evaporating the solvent. The final product is a composite material consisting of a substrate and an encapsulating coating of a solid resin. This particulate material is characterized as free flowing and can be stored for relatively long periods of time at surface temperatures without appreciable agglomeration. A hot coating process may also be used. This technique involves preheating the substrate to several hundred degrees Fahrenheit; slowly adding a fusible resin to the substrate; mixing the substrate and the resin until the resin melts and completely coats the individual particles; and finally cooling the coated particles to return the resin to the solid state. Tests have shown that the resin-coated particles prepared by the solvent process perform better at high stresses than do the particles prepared by the hot coating process. It therefore is preferred that the proppants be prepared by the solvent process.

Regardless of the coating process, it propping preferred that the system include an organosilicon compound to improve the bond between the substrate and resin. For phenolic resins, the preferred coupling agent is an organo-functional silane such as aminoalkylsilane. A silane that has given excellent results with phenolic resins is gamma-aminopropyltriethyoxysilane. For epoxy resins, suitable coupling agents include epoxyalkylsilane esters such as beta-(3, 4-epoxycyclohexyl) ethyltrimethoxysilane. The effect of coupling agents with resins are well known in the art and are described at length in the literature. The most effective coupling agent for a particulate system may be selected on the basis of published literature.

Propping agents used in hydraulic fracturing normally range in particle size from about 6 to about 100 mesh with the most common range being between 10–40 mesh. Parenthetically, it should be noted at this point that any reference to mesh size herein is to the U.S. Standard Sieve Series. Sand is by far the most common propping agent currently used because of its low cost and great abundance. However, under certain conditions high-strength glass beads of the type previously discussed will be the preferred substrate. As will be discussed in greater detail hereinafter, glass beads coated in accordance with the teaching of this application show superior permeability retention properties in high temperature environments and in operations where relatively large mesh size particles are desired. For example, 8–12 mesh glass beads exhibit properties than 8–12 mesh sand at high temperature when immersed in brine. Substrates other than sand and glass beads may also be employed in the practice of this invention such as high-strength, fairly uniform spheres of iron, steel, ceramics, and the like. The ceramic may be sintered bauxite.

The so-called high-strength glass beads or pellets are commercially available materials. One type, sold by Union Carbide Corporation under the tradename UCAR Props, is a vitreous, rigid, inert, substantially spherical pellet. These pellets are available in a variety of mesh sizes and have a high degree of sphericity — Krumbin roundness of 0.8 or greater. The compressive strength of these pellets is very high — in excess of 100,000 psi. Another type sold by Union Carbide Corporation under the tradename UCAR Pac has similar properties. The compressive strength of the UCAR Pac is lower than that of the UCAR Props, but its compressive strength is still four to six times greater than sand in 8–12 and 12–20 mesh sizes.

The particles, coated with the fusible, thermosetting resin, may be stored and handled using conventional fracturing equipment and techniques. Some precautions, however, should be taken to insure that the storage temperature is maintained at moderate levels.

In carrying out the fracturing method, a fracture is first generated by injecting a viscous fluid into the formation at sufficient rate and pressure to cause the formation to fail in tension. Earth stresses normally are such to result in a vertical fracture. Injection of the fluid is continued until a fracture of the desired geometry is obtained. A carrier fluid, preferably salt water or hydrocarbon liquid (such as diesel oil) having the proppant suspended therein is then pumped into the fracture. It should be noted that the temperature of the carrier fluid during pumping operations will be low so as to prevent premature curing of the resin. The carrier fluid bleeds off into the formation and deposits the propping agent in the fracture. If the concentration of the proppant in the carrier fluid is between about 2 and 10 pounds per gallon, the proppant assumes a multilayer pattern.

After the proppant is placed, the well is closed in, with the injection pressure being maintained on the formation. As the pressure within the fracture approaches the normal formation pressure, the fracture walls close on the proppant and apply an overburden stress thereto. At the same time, ambient formation temperature heats the resin. Initially, the resin fuses (e.g., softens or melts) and unites at contact areas with the resin coating of contiguous particles or with the formation walls. As the temperature increases, the polymerization reaction proceeds until the resin is cured to an insoluble, infusible, crosslinked state. The pendular regions between adjacent particles bonds the packed particles into a permeable network having considerable compressive strength. The time required for the resin to cure will depend upon the formation temperature but normally will be from about 1 to about 2 hours.

When the resin has cured, the formation is refractured, which may be by the same procedure described above. The fused resin-coated particles will then be on one wall of the fracture as it re-opens. A somewhat higher pressure will be required to open the fracture the second time, because part of the original fracture is then filled with fused proppant. Propping agent suspended in a suitable carrier fluid is pumped into the second fracture. The propping agent may be the resin coated particles or an entirely different material such as sand, glass beads, or the like. The concentration of the propping agent in the refracture operations is such to provide a multilayer pack.

The procedure for generating and packing the formation may be repeated several times until the desired width of the propping fracture is obtained.

Tests have shown that curing the one-step phenolic resins in either hydrocarbon liquid or salt water can proceed at relatively low temperatures, between about 135° F and 450° F. The polymerization rate may be increased or the temperature at which the resin cures to an infusible state may be lowered by injecting into the propped fracture a low pH liquid such as an aqueous acid solution. In addition, where the formation temperature is low, as it may be in some shallow formations, the resin-coated particles may be injected into the fracture and the resin may be cured by the application of heat from an external source. For example, the particles may be injected into the fracture in the manner previously described. Subsequently, hot oil may be injected into the fracture to supply sufficient heat for the resin to fuse and then cure to an infusible state.

The well should remain closed in for a sufficient time period to permit the resin to cure sufficiently. This will vary considerably but laboratory tests have indicated that from ½ to 24 hours should be sufficient for most wells.

If a fusible thermosetting resin other than the one-step phenolic is employed in the invention, the in situ polymerization of the resin may be initiated and promoted by the injection of a suitable catalyst or curing agent and/or the application of heat from an external source.

Laboratory tests have shown that the resin coated particles have surprisingly high compressive strength and therefore are ideally suited for multiple fracture use in accordance with the present invention. The test procedure for evaluating the resin-coated particles usable in the present invention included the following steps.

a. Samples of silica sand were coated with the one-step phenolic resin by the solvent process described above.

b. Samples of the resin-coated sand were placed in a pressure cell which included two opposed platens for applying a controlled compressive load. The samples were saturated with brine. An initial stress was applied and the temperature was maintained at about 200° F for about 16 hours to cure the resin.

c. Brine was then flowed through the packed cell and the permeability determined at various stress levels.

The permeability versus stress procedure for evaluating proppants is described at length in the literature (see "Conductivity of Fracture Proppants for Multiple Layers" by C. E. Cooke, Jr., *Journal of Petroleum Technology*, September, 1973, pages 1101–1107).

The materials, material description, test conditions and test results are presented below.

Since a minimum amount of prestress on the proppants during cure is desirable, high stress loads should be avoided during initial cure of the resin. This may be achieved by the continued injection of a fluid into the fracture at a pressure less than fracturing pressure until the resin has cured.

Tests were performed on 10–20 mesh sand coated with 3%, 5%, and 8% of one-step phenolic resin and cured in place in a brine environment. These tests showed that all samples retained substantially more permeability than 10–20 mesh sand at high stress lev-

| Sample | Sand Size (mesh) | Coating Resin | % | Type Cure | Test Temp (° F) | Applied Compression (psi) | Permeability (darcies) |
|---|---|---|---|---|---|---|---|
| 1 | 20–40 | No Coating | — | — | 200 | 3,000 | 180 |
|   |   |   |   |   |   | 6,000 | 60 |
|   |   |   |   |   |   | 8,000 | 27 |
|   |   |   |   |   |   | 10,000 | 15 |
| 2 | 20–40 | One-step Phenolic | 5 | & Pre-Cured |   | 3,000 | 150 |
|   |   |   |   |   |   | 5,000 | 41 |
|   |   |   |   |   |   | 8,000 | 10 |
| 3 | 20–40 | One-step Phenolic | 5 | In Place | 200 | 3,000 | 130 |
|   |   |   |   |   |   | 5,000 | 135 |
|   |   |   |   |   |   | 8,000 | 125 |
|   |   |   |   |   |   | 10,000 | 120 |
|   |   |   |   |   | 250 | 10,000 | 80 |
|   |   |   |   |   | 300 | 10,000 | 58 |
| 4 | 10–20 | No Coating | — | & — | 200 | 5,000 | 110 |
|   |   |   |   |   |   | 6,000 | 50 |
|   |   |   |   |   |   | 8,000 | 30 |
| 5 | 10–20 | One-step Phenolic | 3 | & In Place | 200 | 1,000 | 820 |
|   |   |   |   |   |   | 3,000 | 810 |
|   |   |   |   |   |   | 5,000 | 800 |
|   |   |   |   |   |   | 6,000 | 600 |
|   |   |   |   |   |   | 8,000 | 120 |
| 6 | 10–20 | One-step Phenolic | 3 | In Place | 200 | 3,000 | 390 |
|   |   |   |   |   |   | 5,000 | 380 |
|   |   |   |   |   |   | 7,000 | 350 |
|   |   |   |   |   |   | 8,000 | 260 |
|   |   |   |   |   |   | 10,000 | 100 |

The lowest value of stress shown is the stress applied while the resin was cured.

The above data demonstrates that the particles with resin which was cured to the infusible state in place performed much better than the silica sand, or pre-cured phenolic coated sand. The precured phenolic was cured to the infusible state prior to placing the particles in the test cell. The precured phenolic coating was incapable of melting and bonding with coatings or adjacent particles.

Following the permeability measurements, a sample which had been stressed to 8000 psi was removed from the pressure cell and photographed under the scanning electron microscope at a magnification power of 20. The sand particles were completely encapsulated by the resin coating and that the bonds between adjacent sand grains provided relatively large stress-bearing areas. It is significant to note from FIG. 6 that there is little evidence of said fragmentation and that the multilayer consolidated structure has substantial permeability.

Tests have shown that the initial stress on the uncured resin affects the permeability of the resin. For example, at 3000 psi, the uncured resin has an initial permeability close to that of sand. However, as the resin cures to the infusible state with time and temperature, increase in applied stress does not reduce the permeability of the resultant structure as much as in other proppants tested. This is significant because stress levels in the propped fracture normally are higher at high pressure drawdowns, particularly in the immediate vicinity of the wellbore.

els, but higher resin content was preferable at highest stress. Resin coatings of 3 weight percent or higher are preferred, particularly for deep, high stress applications.

In lieu of one-step phenolics, the invention may employ other fusible and thermosetting resins such as two-step phenolic resins or epoxy resins. For example, an epoxy resin including a latent, modified polyamide hardener may be used to coat the sand particles. At surface conditions, the particles may be stored for relatively long periods of time; however, at reservoir conditions, the polymerization reaction is accelerated causing the particles to become bonded together.

The cure step in situ may be controlled by the addition, via carrier fluids, of curing agents, retarding agents, accelerators, or catalysts. Also thermal techniques such as application of heat may be used to control in situ reactions. However, regardless of specific techniques employed, the resins utilized in accordance with the present invention are placed in the well in the substantially solid state and then fused and cured in plate.

To illustrate the superior benefits of the glass beads over silica sand as substrate under certain conditions, samples of the high-strength glass beads were coated with the fusible resin, cured in situ, and the permeability of the cured, fused, resin-coated beads was determined in a high stress, high temperature brine environment. The solvent technique previously described was used to coat 8–12 mesh UCAR Props.

In the coating process, the beads were dry mixed with a powdered phenol formaldehyde resin (BRPE 4035) and a resin solvent was added to the mixture along with a silane coupling agent. The slurry was then dried to evaporate the solvent leaving a residual coating of about 5 weight percent resin on the beads. The resin coating was a hard, outer shell which was nontacky and solid.

Following the initial coating, the beads were placed in a cell and cured in brine for approximately 16 hours at 250° F with an applied stress of 2000 pounds per square inch. The permeability-stress relationships of these resin-coated beads which had been cured in situ were then determined in a manner previously described. Stress was applied to the sample in increasing increments beginning at 2000 pounds per square inch and increasing to 10,000 pounds per square inch at 250° F in a brine environment. Subsequent to the permeability-stress measurements, the sample was removed from the cell and inspected.

The permeability of the in situ cured, resin-coated glass beads ranged from about 1500 to 1800 darcies under stress, and the resin-coated beads retained high permeability throughout the applied stress range from 2000 psi to 10,000 psi at a temperature of 250° F in brine.

The principle of the invention and the best mode in which it is contemplated to apply the principle have been described. It is to be understood that the foregoing is illustrative only and that other means and techniques can be employed without departing from the true scope of the invention defined in the following claims.

We claim:

1. A method of fracturing a subterranean formation penetrated by a well which comprises:
   a. injecting through said well and into said formation a fracturing fluid for forming a fracture therein;
   b. placing particulate propping agent in said fracture;
   c. consolidating at least a portion of said propping agent into a permeable mass;
   d. injecting through said well and into said formation a fracturing fluid to refracture said formation; and
   e. introducing particulate material into said fracture produced by said refracturing step.

2. The method as defined in claim 1 wherein the step of introducing particulate propping agent into said fracture is performed to produce a multilayer pack.

3. The method as defined in claim 1 wherein the particulate propping agent is a particulate material coated with a fusible thermosetting resin, and wherein the step of consolidating said propping agent is performed by causing said thermosetting resin to fuse and cure to thereby bond said particles together.

4. A method as defined in claim 3 wherein said fusible thermosetting resin is a one-step, resole-type phenolic resin.

5. A method as defined in claim 4 wherein said resin is an base-catalyzed phenol formaldehyde.

6. A method as defined in claim 3 wherein said resin is fusible at the normal temperature of said formation.

7. A method as defined in claim 1 wherein the particulate material injected into the formation in step (e) includes particles coated with a fusible thermosetting resin.

8. A method as defined in claim 7 wherein the thermosetting resin is a one step, resole-type phenolic resin which is fusible at the normal temperature of said formation.

9. A method as defined in claim 7 wherein the particles are high-strength glass beads coated with the fusible, thermosetting resin.

* * * * *